(12) United States Patent
Ishii

(10) Patent No.: US 7,529,402 B2
(45) Date of Patent: May 5, 2009

(54) IMAGE INFORMATION PROCESSING APPARATUS, IMAGE INFORMATION PROCESSING METHOD, AND PROGRAM

(75) Inventor: Takahiro Ishii, Tokyo (JP)

(73) Assignee: Sony Corporation, Tokyo (JP)

( * ) Notice: Subject to any disclaimer, the term of this patent is extended or adjusted under 35 U.S.C. 154(b) by 594 days.

(21) Appl. No.: 11/133,610

(22) Filed: May 20, 2005

(65) Prior Publication Data
US 2005/0272993 A1 Dec. 8, 2005

(30) Foreign Application Priority Data
May 21, 2004 (JP) ............................. 2004-151235

(51) Int. Cl.
*G06K 9/00* (2006.01)
*G06T 15/00* (2006.01)
(52) U.S. Cl. .................... 382/154; 345/419; 348/42; 356/12; 382/128
(58) Field of Classification Search ............ 378/69, 378/68, 20, 15, 10, 901, 55, 17, 4, 8, 196; 382/154, 285; 345/419–427; 356/12–14; 348/42–60; 359/462–477
See application file for complete search history.

(56) References Cited

U.S. PATENT DOCUMENTS

| | | | | |
|---|---|---|---|---|
| 5,023,895 A | * | 6/1991 | McCroskey et al. ............ | 378/4 |
| 5,740,224 A | * | 4/1998 | Muller et al. ................. | 378/11 |
| 6,038,282 A | * | 3/2000 | Wiesent et al. ................ | 378/4 |
| 6,229,869 B1 | * | 5/2001 | Hu ................................ | 378/4 |
| 6,422,749 B1 | * | 7/2002 | Polkus et al. .................. | 378/11 |
| 6,459,760 B1 | * | 10/2002 | D'Ambrosio ................. | 378/43 |

(Continued)

FOREIGN PATENT DOCUMENTS

EP          953943 A2 * 11/1999

(Continued)

OTHER PUBLICATIONS

Karabassi et al., 'A fast depth-buffer-based Voxelization Algorithm', 1999, Journal of Graphics Tools, vol. 4 Issue 4 (1999), pp. 5-10.*

(Continued)

*Primary Examiner*—Aaron W Carter
(74) *Attorney, Agent, or Firm*—Frommer Lawrence & Haug LLP; William S. Frommer; Ellen Marcie Emas

(57) ABSTRACT

An image information processing apparatus generating three-dimensional volume data corresponding to a sample on the basis of two-dimensional projection data of the sample from a full circumferential direction acquired by an image capturing apparatus comprising an irradiation unit irradiating transmittable energy onto the sample; a photo detector receiving the energy through the sample; and a rotator rotating the sample is provided. The apparatus includes correcting means correcting pixels of said projection image data depending on an inclination angle of the rotator determined on the basis of a rotation axis of the rotator and an irradiation axis of the irradiation unit; filtering means giving a prescribed filtering processing to projection image data pixels having been corrected by the correcting means; and voxel calculating means calculating voxels of the volume data using the projection image data pixels having been given the filtering processing and depending on the inclination angle of the rotator.

7 Claims, 13 Drawing Sheets

U.S. PATENT DOCUMENTS

| | | | |
|---|---|---|---|
| 6,470,068 B2 * | 10/2002 | Cheng | 378/20 |
| 6,574,297 B2 * | 6/2003 | Tam | 378/15 |
| 7,139,363 B2 * | 11/2006 | Misawa et al. | 378/11 |

FOREIGN PATENT DOCUMENTS

| | | |
|---|---|---|
| EP | 1077430 A2 * | 2/2001 |
| JP | 61 200010 | 12/1986 |
| JP | 4 71536 | 11/1992 |
| JP | 2000 197627 | 7/2000 |
| JP | 2003 260049 | 9/2003 |
| JP | 2003 530939 | 10/2003 |
| JP | 2003 344316 | 12/2003 |
| JP | 2004 132709 | 4/2004 |

OTHER PUBLICATIONS

Huang et al., 'Visualizing Industrial CT Volume Data for Nondestructive Testing Applications', Oct. 2003, Proceedings of the 14th IEEE Visualization Conference 2003, pp. 547-554.*

Toru Sasaki et al., Reconstruction of 3-D X-Ray Computerized Tomography Images Using a Distributed Memory Multiprocessor System, Sep. 1997, vol. 38, Issue: 9, p. 1681-1693.

* cited by examiner

RELATED ART

RELATED ART

RELATED ART

RELATED ART

IMAGE INFORMATION PROCESSING APPARATUS, IMAGE INFORMATION PROCESSING METHOD, AND PROGRAM

CROSS REFERENCES TO RELATED APPLICATIONS

The present document contains subject matter related to Japanese Patent Application JP 2004-151235 filed in the Japanese Patent Office on May 21, 2005, the entire contents of which being incorporated herein by reference.

BACKGROUND OF THE INVENTION

1. Field of the Invention

The present invention relates to an image information processing apparatus, an image information processing method, and a program, and more particularly, to an image information processing apparatus, an image information processing method, and a program that are suitably used in a case where three-dimensional volume data of a sample is generated based on two-dimensional projection image data obtained by irradiating a single scan cone beam of an X-ray etc., for instance, to the sample.

2. Description of Related Art

In recent years, a three-dimensional CT (Computerized Tomography) system capable of acquiring sectional image data of a sample is employed in fields of medical treatments or industries etc. In the three-dimensional CT system, a transmittable energy of an electromagnetic wave such as an X-ray and a γ-ray, and an ultrasonic wave etc., for instance, is irradiated to the sample to acquire (capture) projection image data based on light waves transmitted through the sample. Then, volume data that is specified in the form of a rectangular parallelepiped lattice of a size enough to cover the sample and is composed of more than one voxel supposed to hold an X-ray absorption coefficient value of each sampling point is calculated based on more than one projection image data obtained by capturing an image of the sample from a full circumference direction, leading to a generation of the sectional image data of the sample in an arbitrary direction based on the calculated volume data.

FIG. 10 illustrates one instance of a configuration of a related art three-dimensional CT system. The illustrated three-dimensional CT system is composed of an X-ray source 2 that irradiates a single scan beam of the X-ray to a sample 1, a rotator 3 that rotates the mounted sample 1 in 360 degrees, a photo detecting section 4 that detects the X-ray having transmitted through the sample 1 to generate projection image data, and an image processing apparatus 5 that calculates volume data of the sample 1 based on more than one projection image data obtained from the full circumferential direction of the sample 1, and further generates the sectional image data. It is noted that the above system normally takes an arrangement such that a plane of the rotator 3 is orthogonal to a detection surface of the photo detecting section 4, and a rotation axis of the rotator 3 extends in parallel to one coordinate axis of the detection surface of the photo detecting section 4. Further, the above system is also available in the form of a system configured to provide no rotation of the sample 1 in a mounted condition on the rotator 3, but, fix the sample 1 to permit the X-ray source 2 and the photo detecting section 4 to rotate around the sample 1.

It is noted that a method (which is hereinafter also referred to as a three-dimensional reconfiguration method) of generating, based on more than one projection image data, the volume data corresponding to the sample 1 is described in "Reconfiguration of Three-dimensional X-ray CT image using Distributed memory-type multiprocessor system" by Toru SASAKI and one other, the ninth issue of Information Processing Society thesis journal in Vol. 38 in 1997, for instance.

By the way, as shown in FIG. 11, the related art three-dimensional reconfiguration method has been based on that a projection image of the sample 1 is acquired, with an optical axis (a perpendicular from the X-ray source 2 to the photo detecting section 4) arranged to be perpendicular to the rotation axis of the rotator 3 (which is hereinafter referred to as a related art arrangement).

The related art arrangement, when using a thin plate-shaped object (which is also hereinafter referred to as a plate-shaped sample 1) as the sample 1, is supposed to create an easily transmitting condition of the X-ray (as shown in FIGS. 11A and 11B, for instance) and a hardly transmitting condition or no transmitting condition (as shown in FIGS. 12A and 12B) of the X-ray depending on a difference in a rotation angle of the rotator 3, in which case, a difference between these conditions brings about a difference in image quality of the projection image, resulting in a problem that the three-dimensionally reconfigured volume data obtained using more than one projection image having a different image quality easily yields artifacts.

Further, the related art arrangement, when bringing the rotator 3 close to the X-ray source 2 as shown in FIGS. 13A and 13B, for instance, in an attempt to magnify a size of the plate-shaped sample 1 in the projection image, causes the sample 1 to strike against the X-ray source 2 depending on the rotation angle of the rotator 3, resulting in a problem of difficulty in attainment of a desired magnification.

To solve the above problems, there is proposed, as shown in FIG. 14, for instance, a method of taking an arrangement such that the rotation axis of the rotator 3 is inclined at an angle with the optical axis, without being limited to a perpendicular arrangement. For example, such a method is disclosed in Japanese Patent Laid-open No. 2003-260049 (Patent Document 1). According to the above method, the magnification of the sample 1 in the projection image may be increased, as compared with the related art arrangement. Further, a surface of the plate-shaped sample 1 and the optical axis may be arranged without reaching an alignment, so that there is also an effect that the hardly transmitting condition or no transmitting condition of the X-ray is hard to be created. Thus, the method of taking the arrangement having an inclined angle between the rotation axis of the rotator and the optical axis is given attention as an effective nondestructive inspection method of the plate-shaped sample.

SUMMARY OF THE INVENTION

However, the three-dimensional reconfiguration method is based on the use of the projection image obtained by an orthogonal projection, so that the method of taking the arrangement having an inclined angle between the rotation axis of the rotator and the optical axis has necessitated applying the three-dimensional reconfiguration method after a mapping of the projection image obtained as a non-orthogonal projection image by the projection to the photo detecting section 4 into a virtual projection plane 11 supposed to be given the orthogonal projection of the sample 1. The above Patent Document 1 contains, indeed, no disclosure about the details of a mapping processing of the projection image.

In general, the mapping processing is taken as an image re-sampling processing, so that a re-sampling, when carried out at the same resolution as the projection image obtained in the form of an obliquely projection image, brings about image quality degradations. Thus, the re-sampling processing has raised a problem that it is quite likely to result in an aggravation of the image quality degradations of a reconfigured image.

Further, the re-sampling processing may lead to a relatively large burden on the whole of a reconfiguration processing, and thus, if a processing involving a super-sampling intended to restrain the image quality degradations to some extent is applied to the re-sampling processing, has raised problems that a processing time is more increased, and an increase in projection image recording/storage capacity is also required by several times, leading to a possibility of an exertion of pressures on system memory resources.

As described the above, related art technologies have involved a problem that there is no existence of a three-dimensional reconfiguration processing method that enables a generation of a three-dimensional image, in which a short processing time, no exertion of pressures on system resources, and besides, a high image quality are satisfied, using the projection image having been captured in an arrangement having an inclined angle between the rotation axis of the rotator and the optical axis.

The present invention has been undertaken in view of the above circumstances, and is intended to provide the generation of the three-dimensional image, in which the short processing time, no exertion of pressures on the system resources, and besides, the high image quality are satisfied, using the projection image having been captured in an arrangement having an inclined angle between the rotation axis of the rotator and the optical axis.

An image information processing apparatus according to the present invention includes correcting means correcting pixels of projection image data depending on an inclination angle of a rotator determined based on a rotation axis of a rotator and an irradiation axis of an irradiation unit, filtering means giving a prescribed filtering processing to the pixels of the projection image data having been corrected by the correcting means, and voxel calculating means calculating voxels of volume data using the pixels of the projection image data having been given the filtering processing by the filtering means and depending on the inclination angle of the rotator.

The image information processing apparatus according to the present invention may further include effective area specifying means specifying, on the basis of established capturing conditions and assumed reconfiguration conditions relating to the volume data, an effective area obtained by excluding an area supposed to be not available for a generation of the volume data from the whole area of the projection image data, reconfigurable area calculating means calculating, on the basis of the capturing conditions, a reconfigurable area capable of generating the volume data, and calculation range information generating means generating calculation range information that specifies a common area supposed to provide an overlap of the reconfigurable area with the volume data.

The correcting means may be configured to correct the pixels located in the effective area, among the pixels contained in the projection image data, and the voxel calculating means may be configured to calculate, using the pixels of the projection image data having been given the filtering processing by the filtering means and depending on the inclination angle of the rotator, the voxels of the volume data corresponding to the common area specified by the calculation range information.

The voxel calculating means may be configured to calculate the voxels by repetitive operations of a triple loop corresponding to three coordinate axes of a volume data coordinate system, in which case, the repetitive operations may be composed of additions and subtractions of a three-dimensional vector.

The voxel calculating means may be configured to calculate the voxels of the volume data corresponding to the common area specified by single calculation range information, irrespective of the rotation angle of the rotator and in any of the repetitive operations of the triple loop.

An image information processing method according to the present invention includes a correction step of correcting pixels of projection image data depending on a rotator inclination angle determined on the basis of a rotation axis of a rotator and an irradiation axis of an irradiation unit, a filtering step of giving a prescribed filtering processing to the pixels of the projection image data having been corrected by a processing in the correction step, and a voxel calculation step of calculating voxels of volume data using the pixels of the projection image data having been given the filtering processing by a processing in the filtering step and depending on the inclination angle of the rotator.

A program according to the present invention causes a computer to execute a processing including a correction step of correcting pixels of projection image data depending on a rotator inclination angle determined on the basis of a rotation axis of a rotator and an irradiation axis of an irradiation unit, a filtering step of giving a prescribed filtering processing to the pixels of the projection image data having been corrected by a processing in the correction step, and a voxel calculation step of calculating voxels of volume data using the pixels of the projection image data having been given the filtering processing by a processing in the filtering step and depending on the inclination angle of the rotator.

In the present invention, the pixels of the projection image data are corrected depending on the rotator inclination angle determined on basis of the rotation axis of the rotator and the irradiation axis of the irradiation unit, the prescribed filtering processing is given to the corrected pixels of the projection image data, and the voxels of the volume data are calculated using the pixels of the projection image data having been given the filtering processing.

According to the present invention, there may be provided the generation of the three-dimensional image, in which the short processing time, no exertion of pressures on the system resources, and besides, the high image quality are satisfied, using the projection image having been captured in an arrangement having an inclined angle between the rotation axis of the rotator and the optical axis.

Figure 1:
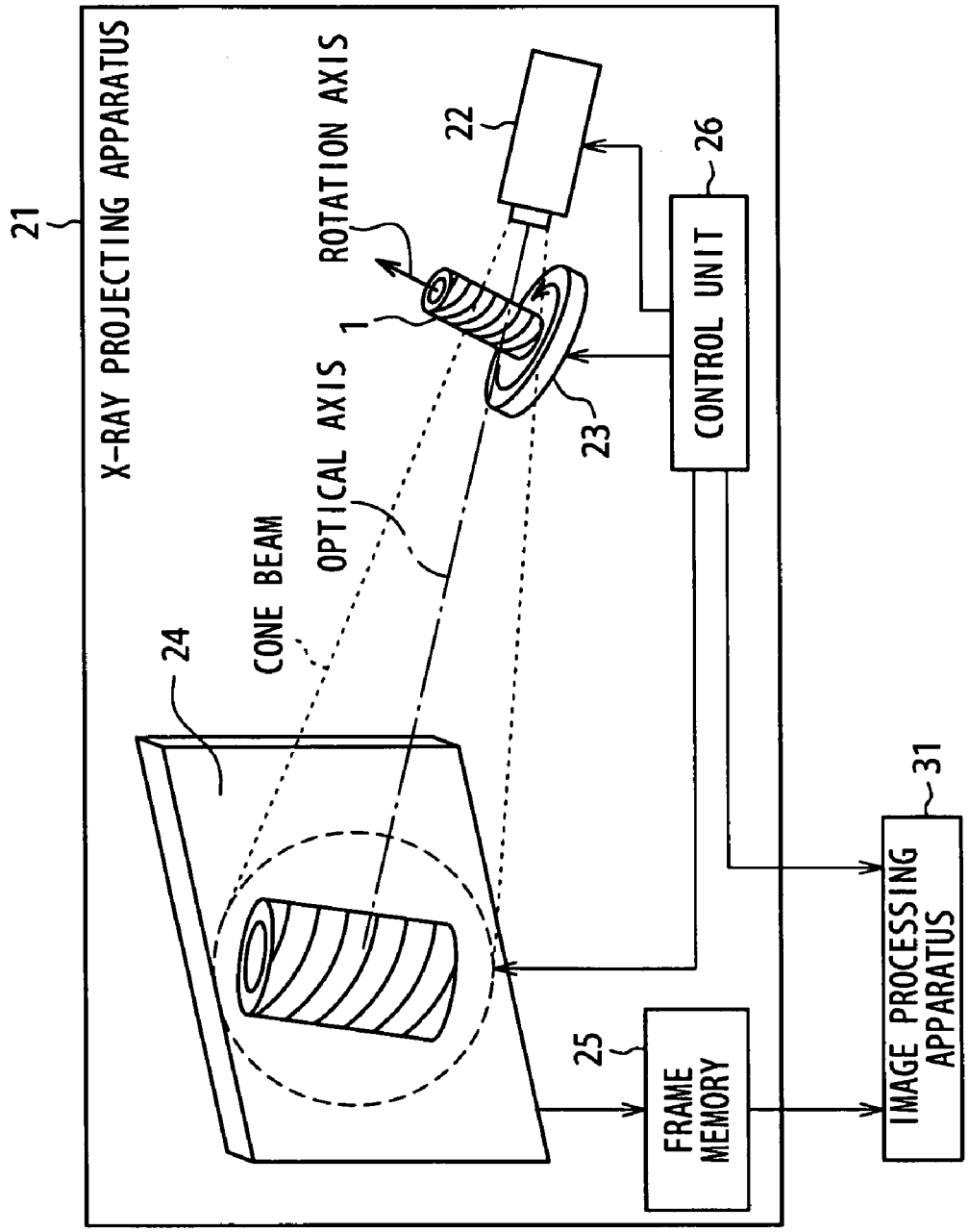
FIG. 1 is a view showing one instance of a configuration of a three-dimensional X-ray CT system under an application of the present invention.

DESCRIPTION OF PREFERRED
EMBODIMENTS

While an embodiment of the present invention is described in the following, a relationship in correspondence between subject matters set forth in Claims and specific instances in the embodiment of the invention is supposed to be illustrated as follows. The following description is to confirm that the specific instances to support the subject matters set forth in the Claims are also set forth in the embodiment of the invention. Thus, granting that there are some specific instances that are not set forth herein as those corresponding to the subject matters, although being set forth in the embodiment of the invention, this fact does not imply that these specific instances are not specified as those corresponding to the subject maters. Conversely, granting that the specific instances are set forth herein as those corresponding to the subject matters, this fact does not imply too that these specific instances are specified as those supposed to be not corresponding to any subject matters other than the above.

Further, the following description is not given as that making a suggestion that the subject matters corresponding to the specific instances set forth in the embodiment of the invention are all set forth in Claims. In other words, the following description is not given as that denying the existence of the subject matters that are not set forth in the Claims of the present application, although being specified as those corresponding to the specific instances set forth in the embodiment of the invention, that is, prospective subject matters for a divisional application or an additional application by an amendment in the future.

An image information processing apparatus (an image processing apparatus 31 in FIG. 1, for instance) according to an embodiment is characterized by including correcting means (a cone correcting unit 54 in FIG. 3, for instance) correcting pixels of projection image data depending on a inclination angle of a rotator determined on the basis of a rotation axis of the rotator, and an irradiation axis of an irradiation unit, filtering means (a filtering processing unit 55 in FIG. 3, for instance) giving a prescribed filtering processing to the pixels of the projection image data having been corrected by the correcting means, and voxel calculating means (a back projection calculating unit 58 in FIG. 3, for instance) calculating voxels of volume data using the pixels of the projection image data having been given the filtering processing by the filtering means and depending on the inclination angle of the rotator.

An image information processing apparatus according to an embodiment of the present invention further includes effective area specifying means (an effective pixel area extracting unit 53 in FIG. 3, for instance) specifying, on the basis of established capturing conditions and reconfiguration conditions relating to assumed volume data, an effective area obtained by excluding the area supposed to be not available for generation of the volume data from the whole area of the projection image data, reconfigurable area calculating means (a reconfigurable area calculating unit 56 in FIG. 3, for instance) calculating, on the basis of the capturing conditions, a reconfigurable area capable of generating the volume data, and calculation range information generating means (a common area calculating unit 57 in FIG. 3, for instance) generating calculation range information that specifies a common area supposed to provide overlap of the reconfigurable area with the volume data.

An image information processing method according to an embodiment of the present invention is characterized by including a correction step (Step S3 in FIG. 7, for instance) of correcting the pixels of the projection image data depending on the inclination angle of the rotator determined on the basis of the rotation axis of the rotator and the irradiation axis of the irradiation unit, a filtering step (Step S4 in FIG. 7, for instance) of giving the prescribed filtering processing to the pixels of the projection image data having been corrected by the processing in the correction step, and a voxel calculation step (Step S7 in FIG. 7, for instance) of calculating the voxels of the volume data using the pixels of the projection image data having been given the filtering processing by the processing in the filtering step and depending on the inclination angle of the rotator.

It is noted that the program of the present invention is the same as the above image information processing method of the present invention in the relationship in correspondence between the subject matters set forth in the Claims and the specific instances in the embodiments of the invention, and thus, a description thereof is omitted.

A specific embodiment under an application of the present invention is now described in detail with reference to the accompanying drawings.

FIG. 1 illustrates one instance of a configuration of a three-dimensional X-ray CT system under the application of the present invention. An illustrated three-dimensional X-ray CT system is composed of an X-ray projecting apparatus 21 that captures an image of a sample 1 while rotating the sample little by little, and then generates two-dimensional projection image data (monochromic image data containing pixels each having a luminance value, for instance) obtained from a full circumferential direction of the sample 1, and the image processing apparatus 31 that generates three-dimensional volume data on the basis of more than one projection image data obtained from the full circumference direction, and then generates arbitrary sectional image data of the sample 1 based on the generated volume data. The volume data stated herein is specified in the form of a rectangular parallelepiped lattice having a size basically enough to cover the sample 1 (it does not matter if the size is insufficient to cover the sample), and is composed of more than one voxel supposed to hold a gray scale value (the luminance value, for instance) of each sampling point.

The X-ray projecting apparatus 21 is composed of an X-ray source 22 that irradiates a single scan cone beam of the X-ray to the sample 1 mounted on a rotator 23, the rotator 23 that rotates the mounted sample 1 in 360 degrees, a photo detecting section 24 that detects the X-ray having transmitted through the sample 1 to generate the projection image data, a frame memory 25 that temporarily holds the generated projection image data, and a control unit 26 that controls an irradiation timing of the X-ray from the X-ray source 22, a rotation angle of the rotator 23, and a detection timing of the photo detecting section 24.

It is noted that an angle of a rotation axis of the rotator 23 with an optical axis of the X-ray source 22 is not fixed in an orthogonal position, unlike the related art general X-ray CT system, whereas the rotator 23 is made adjustable by a user in an angle (an inclination angle γ of the rotator 23) between the rotation axis of the rotator and the optical axis of the X-ray source 22. However, it is assumed that the inclination angle γ of the rotator 23 remains unchanged during a rotation of the rotator 23.

Further, it does not matter if the X-ray source 22 and the detecting section 24 are configured to rotate around the rotator 23 while holding a fixed inclination angle to the rotator 23, provided that the rotator 23 supposed to mount the sample 1 is fixed in a position without being rotated.

The control unit 26 controls the X-ray source 22, the rotator 23, and the photo detecting section 24 so that the projection image data is generated for each change of the rotation angle of the rotator 23. For instance, the change of the rotation angle of the rotator 23, when carried out by 1 degree at a time, for instance, results in a generation of 360 pieces of the projection image data. It is noted that the photo detecting section 24 outputs the generated projection image data to the frame memory 25 after adding, as attribute information to the generated projection image data, a rotation angle β given from the control unit 26 as information of an angle shifted from a reference position of the rotator 23.

Figure 2:
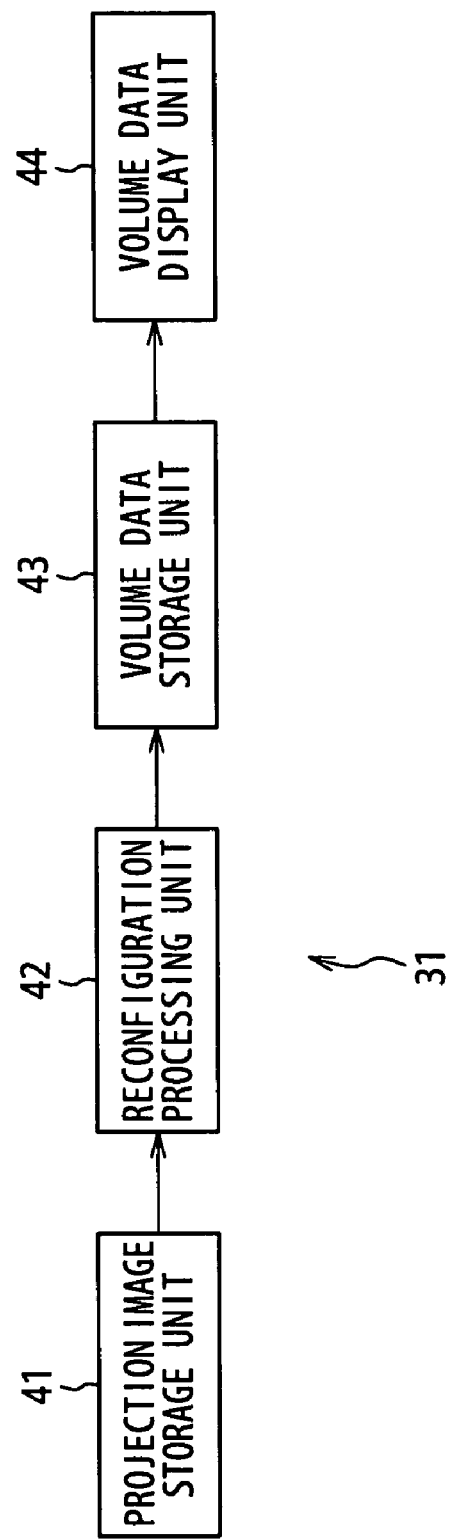
FIG. 2 is a block diagram showing one instance of a configuration of an image processing apparatus of FIG. 1.

FIG. 2 illustrates one instance of a detailed configuration of the image processing apparatus 31. In the illustrated configuration, a projection image storage unit 41 acquires and stores, from the X-ray projecting apparatus 21 of a previous stage, more than one projection image data obtained by capturing the image of the sample 1 from the full circumferential direction. A reconfiguration processing unit 42 generates the volume data on the basis of more than one projection image data stored in the projection image storage unit 41. The volume data generated by the reconfiguration processing unit 42 is stored in a volume data storage unit 43. A volume data display unit 44 generates and displays an arbitrary sectional image and a three-dimensional rendering image etc. of the sample 1 on the basis of the volume data stored in the volume data storage unit 43.

Figure 3:
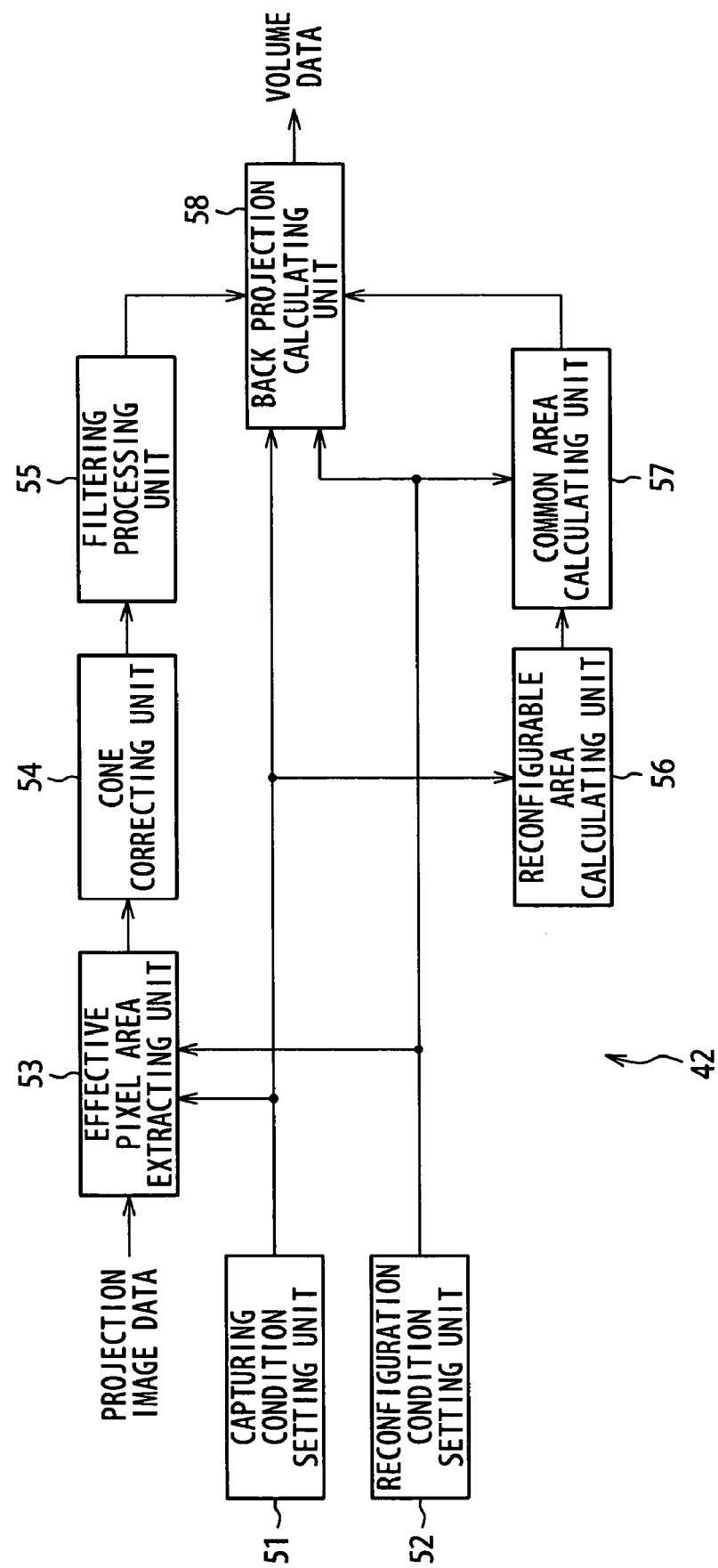
FIG. 3 is a block diagram showing one instance of a configuration of a reconfiguration processing unit of FIG. 2.

FIG. 3 illustrates one instance of a configuration of the reconfiguration processing unit 42 shown in FIG. 2. In the illustrated configuration, a capturing condition setting unit 51 supplies capturing conditions relating to a geometric relation (a mutual distance and an angle etc.) among the sample 1, the X-ray source 22, the rotator 23, and the detecting section 24 etc. to an effective pixel area extraction unit 53, an reconfigurable area calculating unit 56, and a back projection calculating unit 58 on the basis of an input from the user or a prescribed initial value. A reconfiguration condition setting unit 52 supplies, as reconfiguration conditions, an inclination, a position, and a size etc. of the assumed volume data to the effective pixel area extracting unit 53, a common area calculating unit 57, and the back projection calculating unit 58 based on the input from the user or the prescribed initial value.

Figure 4:
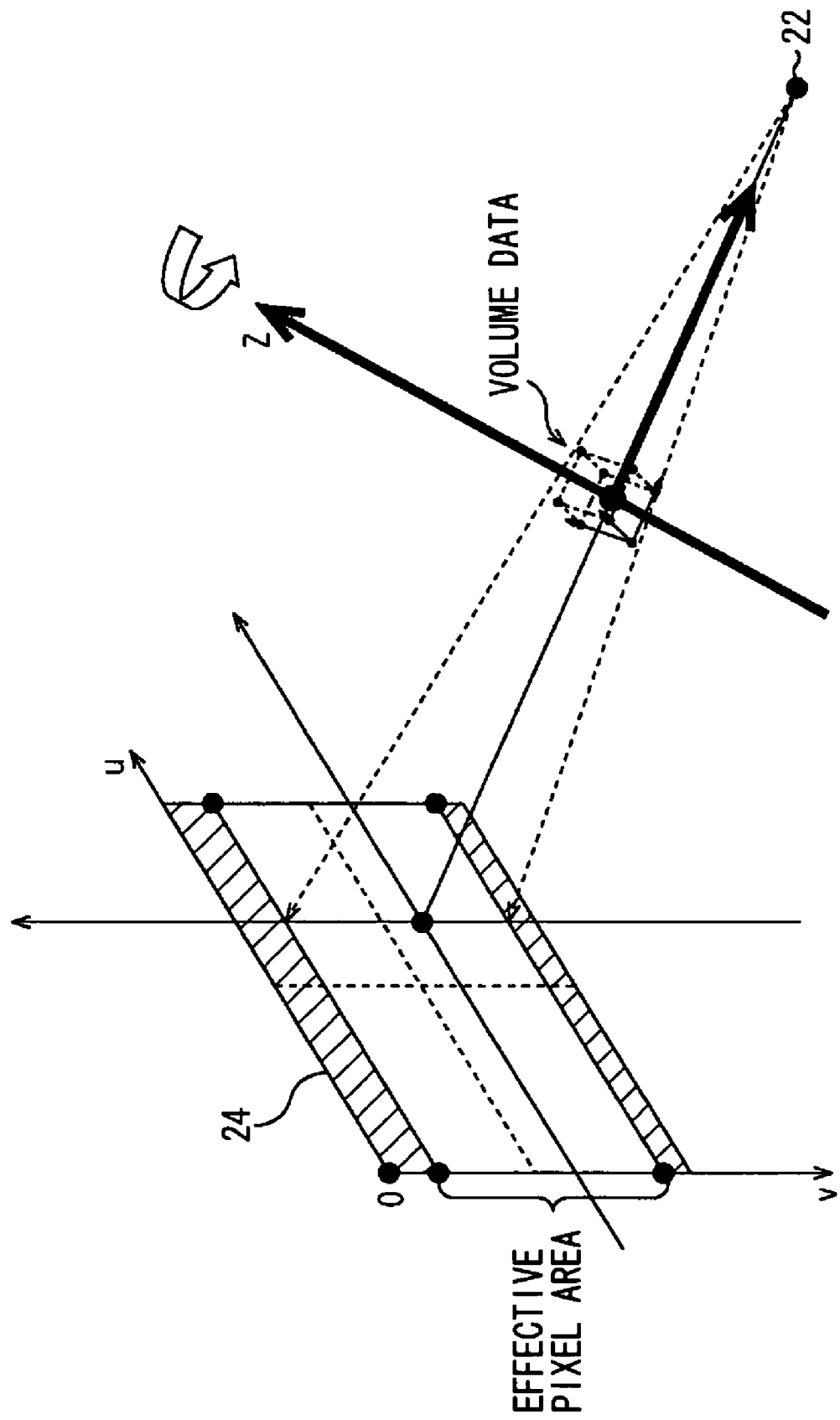
FIG. 4 is a view for illustrating an effective pixel area.

As shown in FIG. 4, the effective pixel area extracting unit 53 extracts, from the projection image data inputted from the apparatus of the previous stage, an area (an effective pixel area in FIG. 4) available for a generation of the volume data, and then outputs information of the area to a cone correcting unit 54. The cone correcting unit 54 gives a corrective transformation suited to the inclination angle γ of the rotator 23 only to pixels located in the effective pixel area extracted by the effective pixel area extracting unit 53, and then outputs the corrected pixels to a filtering processing unit 55. The filtering processing unit 55 gives a filtering processing to the pixels having been given the corrective transformation suited to the inclination angle γ of the rotator 23, and then outputs the obtained pixels to the back projection calculating unit 58.

The corrective transformation and the filtering are given only to the pixels contained in the effective pixel area as described the above, so that a reduction in operation amount, a reduction in amount of the projection image data transferred, and a reduction in amount used for real memory resources etc. may be attained, as compared with a case of the corrective transformation and the filtering processing both given to the whole projection image data.

Figure 5:
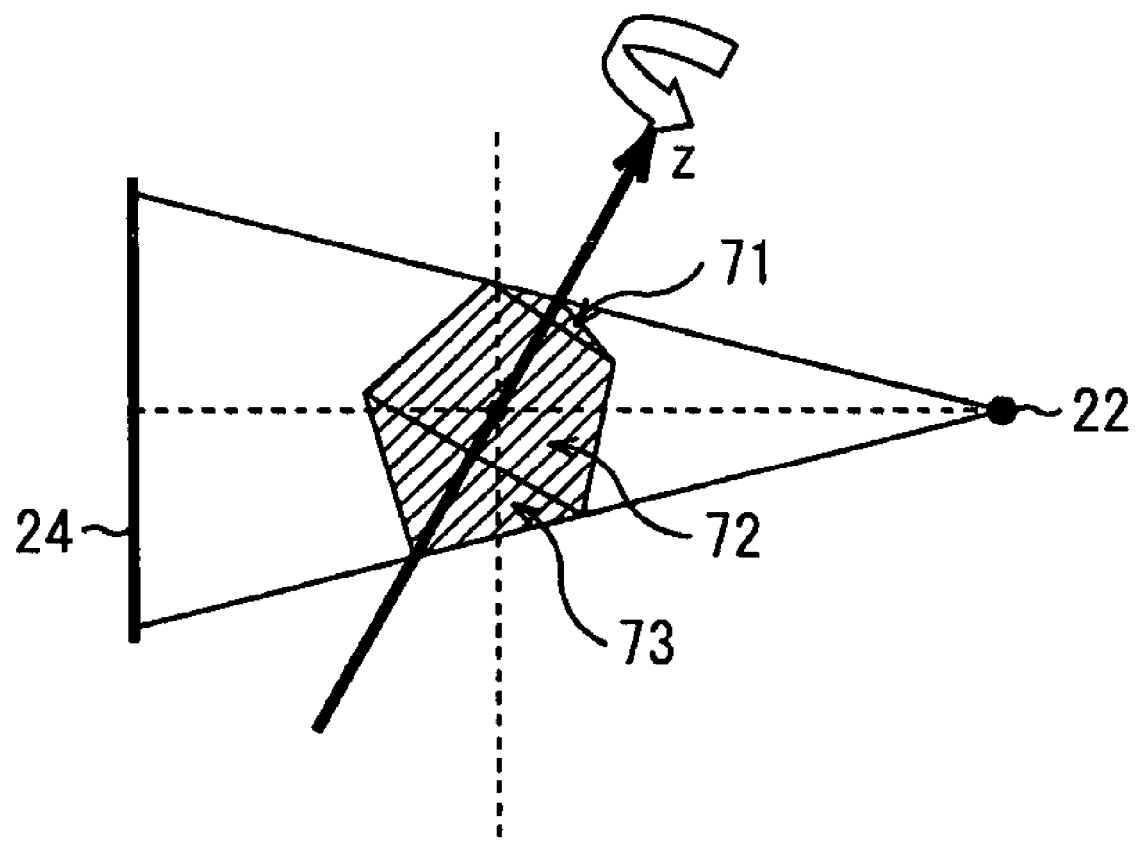
FIG. 5 is a view for illustrating a reconfigurable area.

The reconfigurable area calculating unit 56 calculates, as a reconfigurable area, on the basis of the capturing conditions such as the distance between the X-ray source 22 and the rotator 23, and the rotator size etc., a three-dimensional geometric area that provides an attainment of a projection point of the X-ray to the detecting section 24 at all times irrespectively of the rotation angle β of the rotator 23, specifically, an area that may obtain the pixels good enough for the generation of the voxel. As shown in FIG. 5, the reconfigurable area is specified in the three-dimensional geometric form obtained by a combination of a cone 71, a truncated cone 72, and a cone 73 respectively centered at the rotation axis of the rotator 23. FIG. 5 is a sectional view showing the reconfigurable area in a plane containing the rotation axis of the rotator 23.

The common area calculating unit 57 calculates a common area that provides an overlap of the reconfigurable area calculated by the reconfigurable area calculating unit 56 with the volume data specified from the reconfiguration conditions, and then generates and outputs, to the back projection calculating unit 58 on the basis of a result of a common area calculation, a calculation range table that specifies a back projection calculation range contained in the volume data.

The back projection calculating unit 58 performs a reconfiguration processing (which is hereinafter also referred to as a back projection calculation processing) for the calculation of the voxel only about the area contained in the volume data, specifically, the area specified by the calculation range table inputted from the common area calculating unit 56. Thus, the reduction in operation amount may be attained, as compared with a case of the reconfiguration processing performed over the whole volume data.

Figure 6:
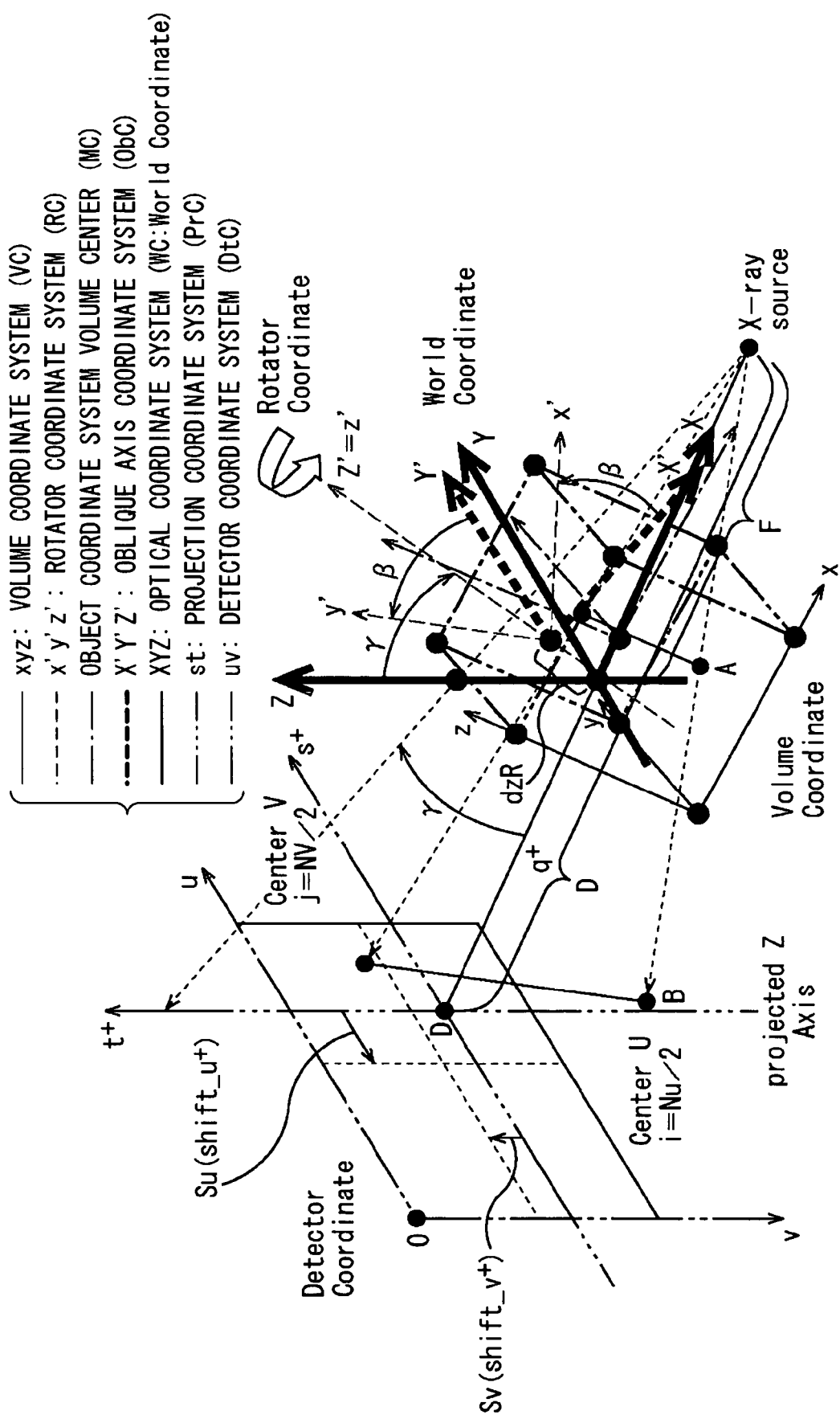
FIG. 6 is a view for illustrating coordinate systems.

An operation carried out by the image processing apparatus 31 is now described, provided that coordinate systems applied to a following description are supposed to involve seven coordinate systems shown in FIG. 6, in which case, variables are defined as follows.

A definition of the variables relating to the coordinate systems is as follows:
xyz: VC=Volume coordinate system (Right-handed system)
 :MC=Volume center coordinate system (Right-handed system)
x'y'z': RC=Rotator coordinate system (Right-handed system)
XYZ: WC=Optical coordinate (World coordinate) system (Right-handed system)
X'Y'Z': ObC=Oblique axis coordinate system (Right-handed system)
st: PrC=Projection coordinate system
uv: DtC=Detector coordinate system The definition of the variables relating to the volume data is as follows:
(x, y, z): Coordinates of a voxel point A in the VC (Center of the voxel in a case of an integer) (in voxel units)
Nx, Ny, Nz: Resolution in each axial direction of the volume data (in voxel units)
dx, dy, dz: Length per voxel (in millimeter units)

ex, ey, ez: Set of vectors relating to a rotation involved in a transformation from VC to MC (|ex|=|ey|=|ez|=1)

(Sx, Sy, Sz): Amount of translation of a volume center as viewed from the RC (in millimeter units)

Sd: Actual-measured vector in the amount of translation of the volume center as viewed from the RC (in millimeter units) (when Sd=0, and V=E, a straight line {∀z; x=floor (Nx/2); y=floor(Ny/2)} is specified as the rotation axis.)

The definition of the variables relating to the rotator 23 is as follows:

D: Distance between the X-ray source 22 and the detecting section 24 (in millimeter units)

F: Distance between the X-ray source 22 and a rotation center (=a point of the rotation axis intersecting the optical axis) (in millimeter units)

β: Amount of rotation of the rotator 23. Angle shifted from ObC-X' axis to RC-x' axis (in radian units)

γ: Inclination angle of the rotation axis of the rotator 23. Amount of rotation of RC-z' axis around WC-Y axis (in radian units)

dzR: Amount of vertical translation of the rotator 23. Translation of the RC to a rotation axis direction (z'+) (in millimeter units)

(x', y', z'): Coordinates of the point A in the RC (in millimeter units)

(X', Y', Z'): Coordinates of the point A in the ObC (in millimeter units)

(X, Y, Z): Coordinates of the point A in the WC (in millimeter units)

The definition of the variables relating to the projection image data is as follows:

(u, v): Coordinates of the point A in the DtC of a projection point B (a pixel center is the integer) (in pixel units)

(s, t): Coordinates in the PrC of the point B (in millimeter units)

Nu, Nv: Resolution in each axial direction of the detector du, dv: Pixel pitch of the detector (in millimeter units)

Su, Sv: Amount of shift of the detector (in pixel units) (when the amount of shift is 0, a straight line {u=Nu/2} is specified as t-axis, and a straight line v=Nv/2 is specified as s-axis)

p(u, v, β): Pixel value of the coordinates (u, v) of the projection image having already given a LOG transformation at the time when using the amount of rotation β of the rotator 23.

The voxels of the volume data are supposed to be contained, in the form of a three-dimensional array in order of z, y, and x, in a memory of the volume data storage unit 43. Further, it is assumed that floor (a) is a value that specifies a maximum integer equal to or less than a.

Furthermore, a following expression (1) is supposed to be used for an operation of calculating the pixel coordinates (u, v) of the projection image corresponding to voxel coordinates (x, y, z).

$$(u, v) = (U/W, V/W) \quad (1)$$

$$(U, V, W, 1) = (z, y, z, 1) \cdot M \quad (2)$$

Where $$M = GA_{(\gamma)}B_{(D,F)}C = TVR_{(\beta)}A_{(\gamma)}B_{(D,F)}C \quad (3)$$

$$G_{(\beta)} = TVR_{(\beta)} \quad (4)$$

A 4 by 4 matrix T contained in a matrix M is expressed in the form of a center point translation/unit system transformation matrix (VC->MC).

$$T = \begin{pmatrix} dx & 0 & 0 & 0 \\ 0 & dy & 0 & 0 \\ 0 & 0 & dz & 0 \\ -dx*\text{floor}\left(\frac{Nx}{2}\right) & -dy*\text{floor}\left(\frac{Ny}{2}\right) & -dz*\text{floor}\left(\frac{Nz}{2}\right) & 1 \end{pmatrix} \quad (5)$$

A 2 by 4 matrix V contained in the matrix M is expressed in the form of a model arrangement transformation matrix (MC->RC).

$$V = \begin{pmatrix} e_x & 0 \\ e_y & 0 \\ e_z & 0 \\ Sd & 1 \end{pmatrix} = \begin{pmatrix} e_x & 0 \\ e_y & 0 \\ e_z & 0 \\ dx*Sx & dy*Sy & dz*Sz & 1 \end{pmatrix} \quad (6)$$

A 4 by 4 matrix $R_{(\beta)}$ contained in the matrix M is expressed in the form of a rotator rotation transformation matrix (RC->ObC).

$$R_{(\beta)} = \begin{pmatrix} \cos(\beta) & \sin(\beta) & 0 & 0 \\ -\sin(\beta) & \cos(\beta) & 0 & 0 \\ 0 & 0 & 1 & 0 \\ 0 & 0 & 0 & 1 \end{pmatrix} \quad (7)$$

A 4 by 4 matrix $A(\gamma)$ contained in the matrix M is expressed in the form of a rotation axis inclination transformation matrix (ObC->WC).

$$A_{(\gamma)} = \begin{pmatrix} \cos\gamma & 0 & -\sin\gamma & 0 \\ 0 & 1 & 0 & 0 \\ \sin\gamma & 0 & \cos\gamma & 0 \\ dzR \times \sin\gamma & 0 & dzR \times \cos\gamma & 1 \end{pmatrix} \quad (8)$$

A 4 by 4 matrix $B_{(D,F)}$ contained in the matrix M is expressed in the form of a back projection transformation matrix (WC->PrC).

$$B_{(D,F)} = \begin{pmatrix} 0 & 0 & -1/D & 0 \\ 1 & 0 & 0 & 0 \\ 0 & 1 & 0 & 0 \\ 0 & 0 & F/D & 1 \end{pmatrix} \quad (9)$$

A 4 by 4 matrix C contained in the matrix M is expressed in the form of a detector matrix (PrC->DtC).

$$C = \begin{pmatrix} 1/du & 0 & 0 & 0 \\ 0 & -1/dv & 0 & 0 \\ Su + \text{floor}\left(\frac{Nu}{2}\right) & Sv + \text{floor}\left(\frac{Nv}{2}\right) & 1 & 0 \\ 0 & 0 & 0 & 1 \end{pmatrix} \quad (10)$$

Further, the image processing apparatus 31 takes advantage of, in an extended form, a following expression (11)

applied to the case of a Feldkamp method that is a kind of a normally available three-dimensional reconfiguration method.

$$V(x, y, z) = \frac{1}{2} \int_0^{2\pi} \frac{F^2}{(F - r \cdot \hat{X})^2} \quad (11)$$

$$\int_{-L}^{L} \left\{ p(u, t(r), \beta) \frac{D}{\sqrt{D^2 + u^2 + t^2(r)}} \right\} h(s(r) - u) du d\beta$$

Specifically, the image processing apparatus is supposed to take advantage of a following expression (12) obtained by deriving the coordinate transformation starting with a virtually orthogonal capturing condition by taking advantage of features of a convolution integral in consideration of the oblique rotation axis.

$$V(x, y, z) = \frac{1}{2} \int_0^{2\pi} \frac{(F \cos \gamma)^2}{(F \cos \gamma - X')^2} q(u(r), v(r), \beta) d\beta \quad (12)$$

Provided that h(u) is assumed to be a filter kernel, and * is assumed to be the convolution integral, q(u, v, β) is expressed as follows.

$$q(u, v, \beta) = \left[ p(u, v, \beta) \frac{(t(v) \sin \gamma + D \cos \gamma)^2}{D \cos \gamma \sqrt{D^2 + s(u)^2 + t(v)^2}} \right] * h(u) \quad (13)$$

$$\begin{pmatrix} s(u) \\ t(v) \end{pmatrix} = \begin{pmatrix} du\{u - (Su + Nu/2)\} \\ -dv\{v - (Sv + Nv/2)\} \end{pmatrix}$$

Figure 7:
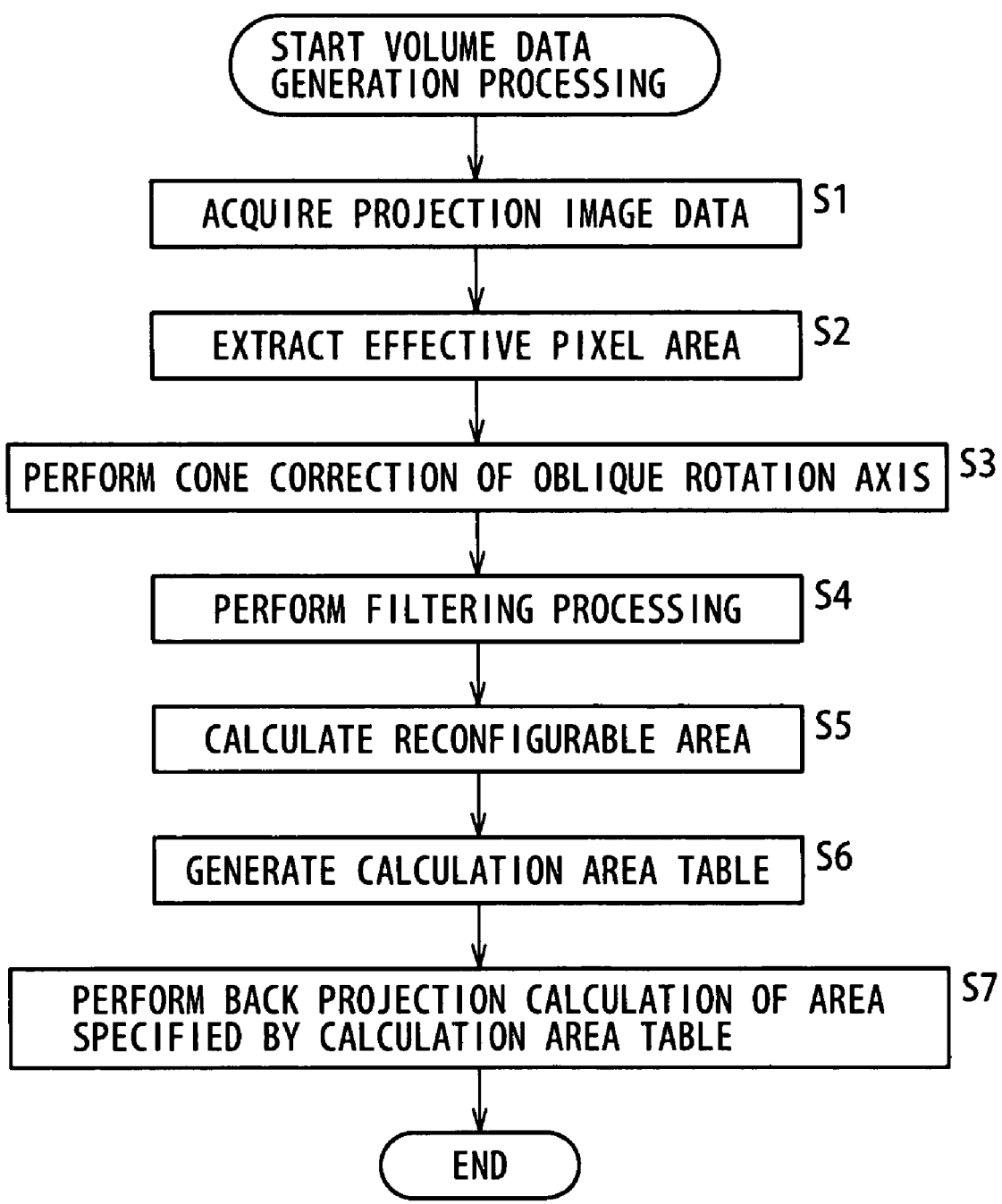
FIG. 7 is a flowchart for illustrating an operation of the image processing apparatus 31 of FIG. 1.

An operation of the image processing apparatus 31 shown in FIG. 2 is now described with reference to a flowchart in FIG. 7.

In Step S1, the projection image storage unit 41 acquires and stores, from the X-ray capturing apparatus 21 of the previous stage, more than one projection image data obtained by capturing the image of the sample 1 from the full circumferential direction. In Step S2, the effective pixel area extracting unit 53 of the reconfiguration processing unit 42 extracts the effective pixel area of the projection image data inputted from the previous stage.

Specifically, 16 pieces of points of XZ section intersecting 8 pieces of circles specified as loci of 8 pieces of vertexes of the assumed volume data (the rectangular parallelepiped) are projected on the projection image data using the expression (1). Provided that intersection coordinates are specified as (x, y, z), and projection point coordinates are specified as (u, v). Then, a maximum existence area of a v value in the projection point coordinates (u, v) is calculated to establish an upper limit and a lower limit of v. This maximum existence area of the v value results in an agreement with an area of v contained in a maximum existence area in projection shape of the volume data.

If it is seen that the common area to be calculated in the following processing is specified in the form of the rectangular parallelepiped, the upper and the lower limits of v may be established optimally by applying a method similar to the above to 8 vertexes of the rectangular parallelepiped. By the way, a general cone beam method normally requires that a one-dimensional convolution processing should be performed in a whole area of scan lines in a u-direction, permitting no determination of an effective area in the u-direction.

However, if a reconfiguration method that imposes no restriction on an area of available scan lines is taken, it is allowable to make a determination of the effective area in the u-direction.

In Step S3, the cone correcting unit 54 gives, using a following expression (14), the corrective transformation suited to the inclination angle γ of the rotator 23 only to the pixels located in the effective pixel area extracted by the effective pixel area extracting unit 53, and then outputs a result of the corrective transformation to the filtering processing unit 55.

$$I(u, v, \beta) = \frac{D \cos \gamma}{k(t(v))^2 \sqrt{D^2 + s(u)^2 + t(v)^2}} p(u, v, \beta), \quad (14)$$

where k(t) is expressed as follows:

$$k(t) = \frac{D \cos \gamma}{t \sin \gamma + D \cos \gamma} \quad (15)$$

$$\begin{pmatrix} s(u) \\ t(v) \end{pmatrix} = \begin{pmatrix} du\{u - (Su + Nu/2)\} \\ -dv\{v - (Sv + Nv/2)\} \end{pmatrix}$$

In Step S4, the filtering processing unit 55 gives the filtering processing to the pixels having been given the corrective transformation suited to the inclination angle γ of the rotator 23, and then outputs the obtained pixels to the back projection calculating unit 58.

Figure 8:
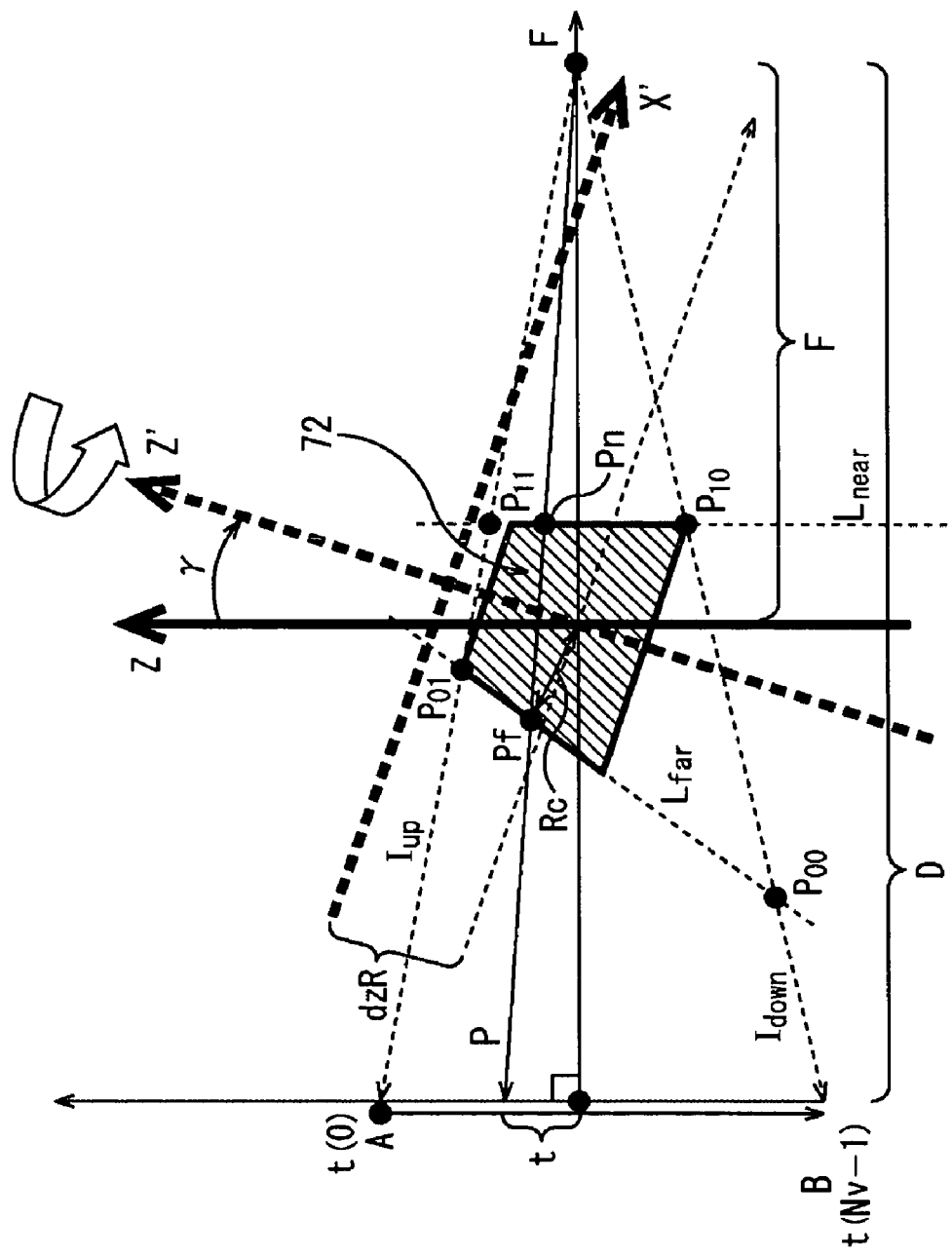
FIG. 8 is a view for illustrating the reconfigurable area.

In Step S5, the reconfigurable area calculating unit 56 calculates, on the basis of the capturing conditions, the reconfigurable area specified in the three-dimensional geometric form obtained by the combination of the cone 71, the truncated cone 72, and the cone 73 respectively centered at the rotation axis of the rotator 23, as shown in FIG. 5. More specific description is given in the following. FIG. 8 is a sectional view showing the reconfigurable area in a plane passing through the rotation axis of the rotator 23 and the optical axis.

For instance, as for the truncated cone 72, a radius Rc (Z') of a circle in perpendicular section to the rotation axis of the truncated cone 72, when calculated on the assumption that Z' is specified as a parameter, is given as shown in a following expression (15).

$$Rc(Z') = s_{min} \frac{-\sin\gamma(Z' + dzR) + F}{\sqrt{s_{min}^2 \cos^2\gamma + D^2}}, \quad (15)$$

where:
s(u)=du{u−(Su+floor(Nu/2))}, and
$s_{min}$=min(|s(0)|, |s(Nu−1)|).

Then, a radius and a position of each of an upper base and a lower base of the truncated cone 72 are calculated by comparing elements of Z' after finding, on the ObC coordinate system, four pieces of points $P_{00}$, $P_{10}$, $P_{01}$, and $P_{11}$ of straight lines FA and FB intersecting the side faces of the truncated cone 72 shown in FIG. 8. As for the cones 71 and 73, a height of each of the cones 71 and 73 is calculated by finding the points of a straight line Z' intersecting each of the straight lines FA and FB. In this manner, the calculation of the reconfigurable area is performed.

In Step S6, the common area calculating unit 57 calculates the common area that provides the overlap of the reconfigurable area calculated by the reconfigurable area calculating unit 56 with the volume data specified from the reconfiguration conditions, and then generates the calculation range table that specifies a range of the common area in a z-direction. Specifically, a straight line $l'_z$ is calculated through the transformation of a scan line $l_z$ (x, y) (x and y are integers) in the z-direction on the volume data from the VC coordinate system to the RC coordinate system using a following expression (16).

$$(x', y', z', 1) = (x, y, z, 1) \times T \times V \tag{16}$$

Then, two points P'1 and P'2 of the calculated straight line $l'_z$ intersecting the reconfigurable area are calculated. Subsequently, an back transformation of the transformation shown in the expression (16) is performed to restore (transform) the calculated two intersecting points P'1 and P'2 to the coordinates P1 and P2 of the volume coordinate system. Further, under the definition of an area [0, Nz–1] in the z-direction of the volume data as Rf, and an area of the z-coordinates of P1 and P2 as Rp, an area common to the areas Rf and Rp is specified as a calculation range [z1: z2] in the z-direction of the volume data with respect to (x, y), and the specified calculation range is outputted as the calculation range table to the back projection calculating unit 58.

The area in the z-direction with respect to a combination of each (x, y), if once generated as the calculation range table in this manner, may be applied to the back projection calculation supposed to be performed using the arbitrary rotation angle β of the rotator 23. This is based on that the reconfigurable area is specified in the form of an axial symmetry, and the common area (the area specified by the calculation range table) supposed to rotate around the axis of the reconfigurable area is not dependent on the rotation angle β.

While the above description has suggested transforming temporarily the scan line $l_z$ (x, y) in the z-direction of the volume data into the rotator coordinate system to calculate the points of the above scan line intersecting the reconfigurable area, it is also allowable to perform the transformation into the coordinate systems other than the rotator coordinate system for the calculation of the intersecting points.

Further, it is also allowable to redefine the three-dimensional array size of the volume data as a smallish value depending on the calculation range table. It may well be that the amount of data is decreased below the original three-dimensional array, if the three-dimensional array is assigned to the memory, provided that the retrieval of the calculation range table is performed to determine a new z size by calculating the maximum area of z in the arbitrary areas of x and y, and subsequently, to determine new x and y sizes by calculating the maximum existence area of x or y in the area of z other than 0. In this case, a display processing of a sectional image or a three-dimensional image supposed to be performed after the generation of the volume data also decreases in processing amount, so that an increased processing speed is expected to be attainable. Furthermore, if the voxel data and the calculation range table within the area are preserved using the calculation range table, it may be also expected that a file recording processing takes place in a short period of time, and a recording file amount is decreased.

In Step S7, the back projection calculating unit 58 performs the reconfiguration processing of the volume data by calculating, using the expression (1), the pixel coordinates (u, v) of the projection image with respect to the voxel coordinates (x, y, z) contained in the volume data and located within the z-direction area specified by the calculation range table inputted from the common area calculating unit 57, then calculating a pixel value in the pixel coordinates (u, v) using an interpolating calculation, and further multiplying a back projection correction coefficient $K_{BP}$ as shown in a following expression (17) by the calculated pixel value for a cumulative addition to the voxel value in the above voxel coordinates.

$$K_{BP} = \left(\frac{F\cos\gamma}{F\cos\gamma - X'}\right)^2 \tag{17}$$

Specifically, the voxels of the volume data are assumed to be in the form of the three-dimensional array containing the voxels in the order of z, y, and x, so that the calculation of the back projection of the center point of each voxel at high speed requires an operation according to a triple loop that takes the order that a z-loop is specified as an innermost loop, and y- and x-loops are followed. In this operation, an increment (dU, dV, dW) of a projection element at the time when z is incremented by 1 is operated using a following expression (18).

$$(dU, dV, dW, 0) = (0, 0, 1, 0) \cdot M \tag{18}$$

Further, an increment dX' of X' at the time when z is incremented by 1 is operated using a following expression (19) involving the use of a four-dimensional vector gx generated by extracting a first column from a matrix G.

$$dX' = (0, 0, 1, 0) \cdot gx \tag{19}$$

The z-loop is put into the operation based on pseudo-codes shown as follows by making use of the increments (dU, dV, dW) and dX' obtained in this manner.

```
/*----Pseudo-code of high-speed back projection for
oblique rotation axis----*/
// ※ "+=" is Operator serving to add right-side value to
left-side value
// ※ "*p++" is Operation of forwarding address next
after substitution of value for address p
//****Get already filtered projection image data of
rotator angle β
projection = GetProjection(β);
//****Calculate increment of scan line in z-direction
(dU, dV, dW, 0) = (0, 0, 1, 0) · M
dX' = (0, 0, 1, 0) · gx
for (x = 0; x < Nx; x = x + 1){
    for (y = 0; y < Ny; y = y + 1){
        //****Get calculation range [z1, z2] of z with
calculation range table
            GetIndexRangeOnScanLineZ (zTable, x, y, &z1, &z2);
        //****Calculateinitial values of U, V, W, and X' at
starting point of scan line in z-direction
            (U, V, W, 1) = (X, Y, z1) · M;//Vector matrix
product
            X' = (X, Y, z1) · M;//Inner product
            fd = f - X',
        //****Get starting point address of scan line in z-
direction
            p = GetVoxelAddress (volume, x, y, z1);
        //****z-loop
            for (z = z1; z<-z2; z-z+1){
                u = U/W; v = V/W;
                //**Back projection: Get, correct, and
integrate projection image pixels after interpolation
                K_BP = (f/fd)^2;
                    *p++ += K_BP · GetPixelValue (projection, u, v);
                //**Increment for next calculation.
                Increment fd directly, instead of X'
                    U += dU; V += dV; W += dW; fd += -dX';
            }
    }
}
```

The operation that conforms to the above pseudo-codes involves no matrix operation, but several times of additions and subtractions within the z-loop supposed to be repeated most frequently, and thus has an effect on the reduction in operation time. Further, a voxel address calculation is satisfied only by preliminarily calculating a head address outside the z-loop, so that a continuous access may be provided at high speed within the z-loop only by the address increment operation. This access is easy to hit a cache of a recent general-purpose CPU as well, permitting a contribution toward an increase in speed. Furthermore, the area of z is restricted enough to meet requirements, so that there is no need to perform a useless calculation of the back projection.

The description of the operation carried out by the image processing apparatus 31 is concluded.

As described above, according to the image processing apparatus 31 under the application of the present invention, the volume data having been set to meet the arbitrary arrangement, size, and resolution may be generated at high speed based on the projection image having been captured, with the rotation axis of the rotator 23 arranged to be not orthogonal but inclined at the angle with the optical axis of the X-ray source 22.

Thus, there is every reason to expect an effect of providing, in a short period of time, a nondestructive inspection of the plate-shaped sample having been heretofore supposed to be difficult to be inspected, in particular, the plate-shaped sample that hardly permits the X-ray to pass through, and has a complicated internal three-dimensional shape, such as a semiconductor chip, a BGA (Ball Grid Array) solder, and an electronic substrate etc.

Further, if the rotator is arranged with its rotation axis inclined to prevent the mounted sample from striking against the X-ray source, the magnification of the projection image, consequently, the magnification of the volume data to be reconfigured may be increased. This enables, within a practical period of time, an inside observation of the sample at a high magnification and a high resolution that have been not heretofore brought to realization.

While the embodiment of the present invention has suggested applying the orthogonal three-dimensional coordinate system of the right-handed system to the reconfiguration processing of the volume data, other coordinate systems may also be applied.

Figure 9:
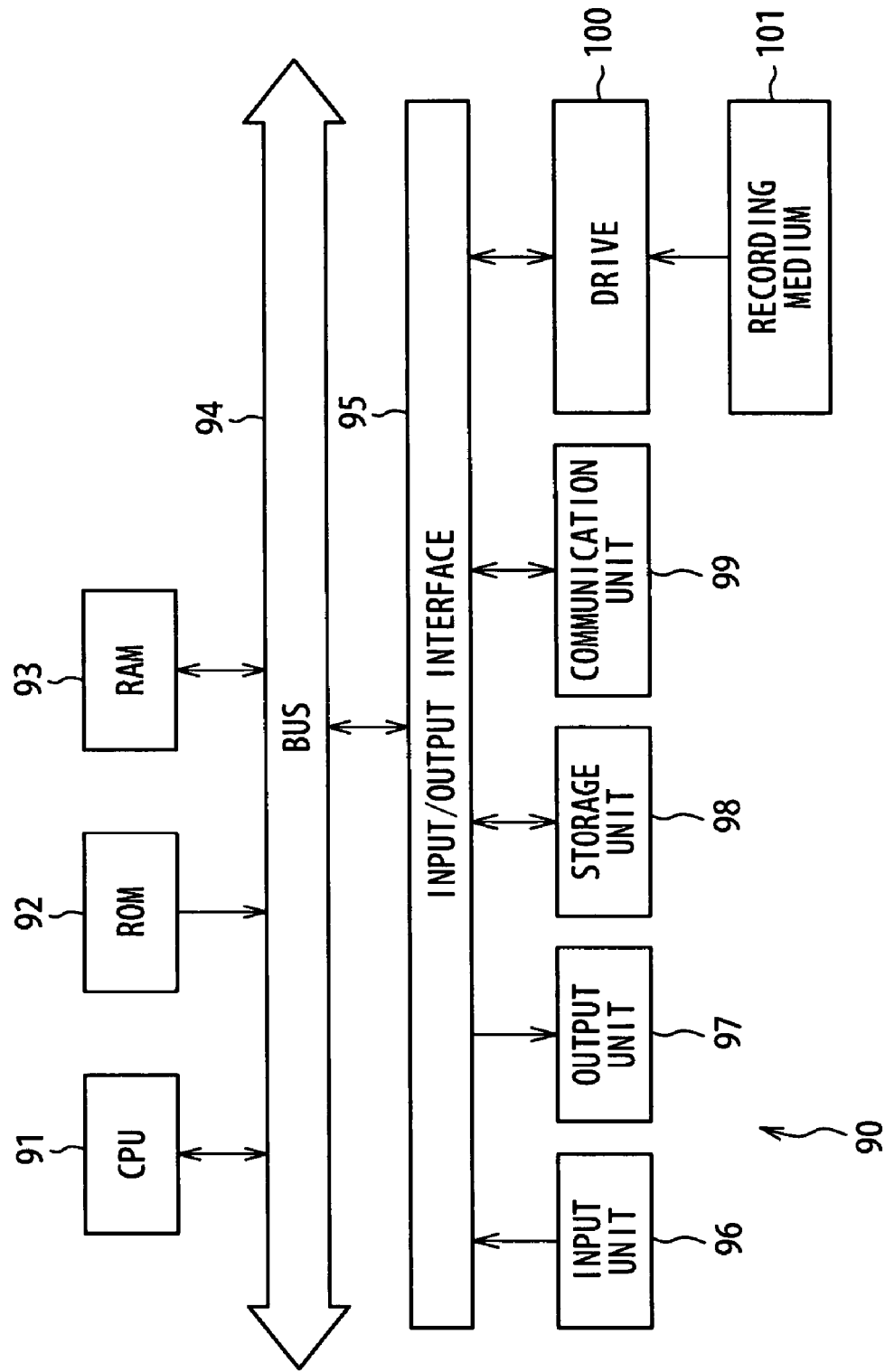
FIG. 9 is a block diagram showing one instance of a configuration of a personal computer.
Figure 10:
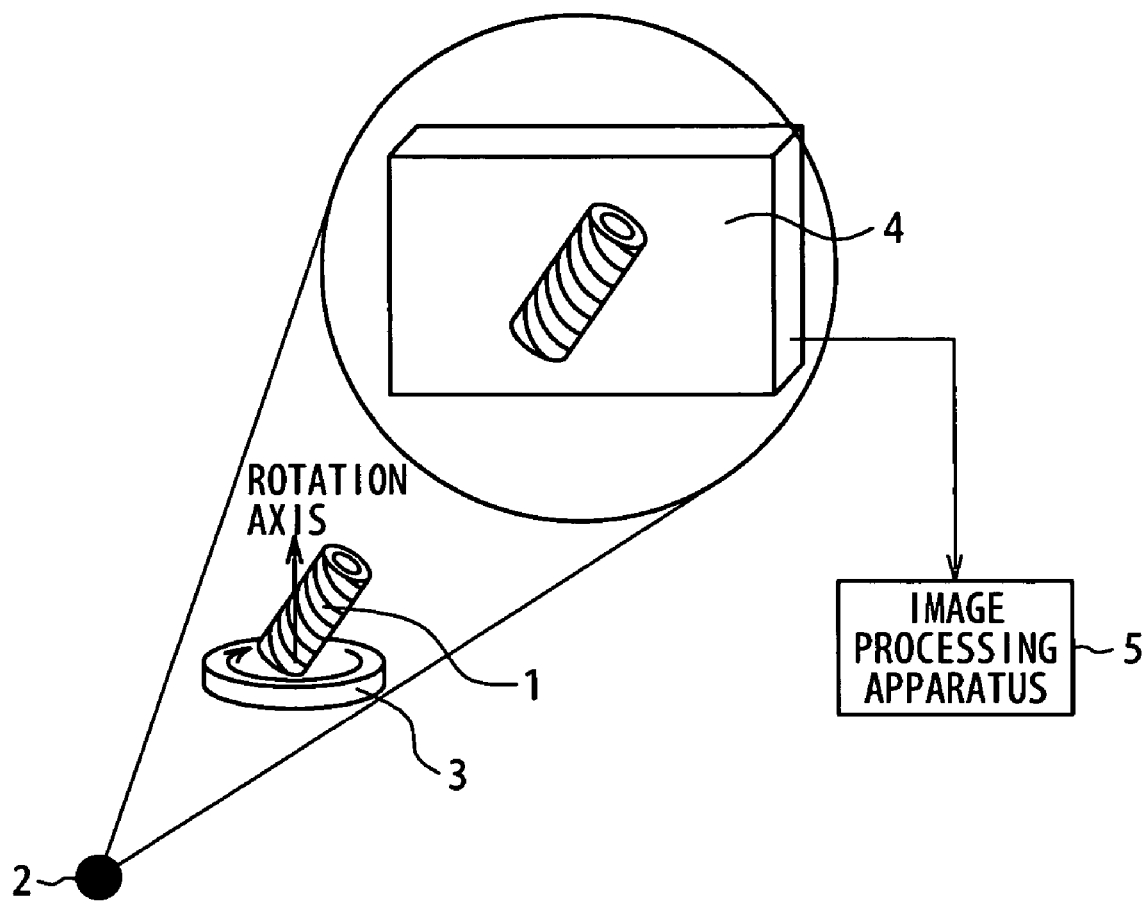
FIG. 10 is a view showing one instance of a configuration of a related art three-dimensional CT system.
Figure 11A:
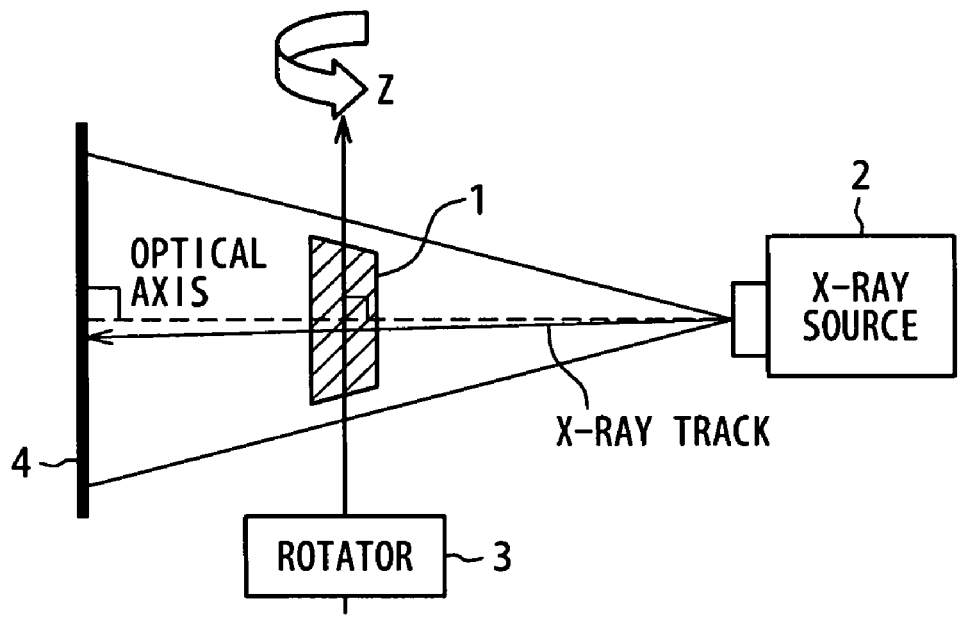
FIG. 11a-11b is a view for illustrating problems with a plate-shaped sample in the related art three-dimensional CT system.
Figure 11B:
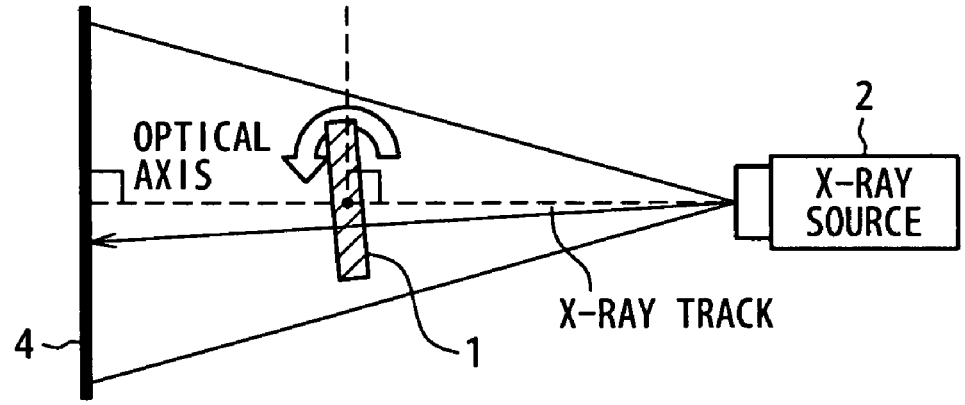
Figure 12A:
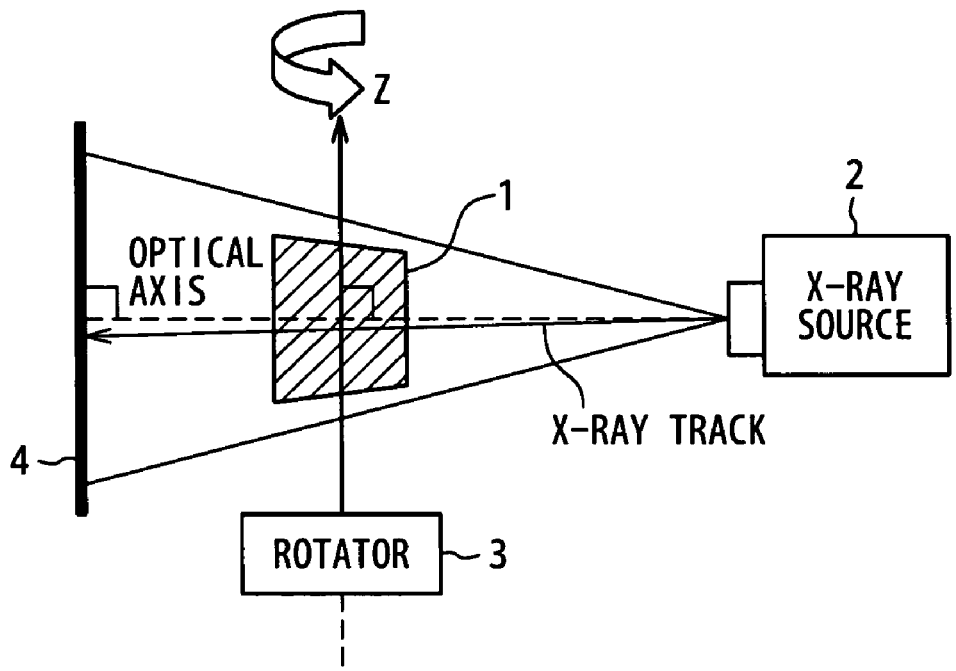
FIG. 12a-12b is a view for illustrating the problems with the plate-shaped sample in the related art three-dimensional CT system.
Figure 12B:
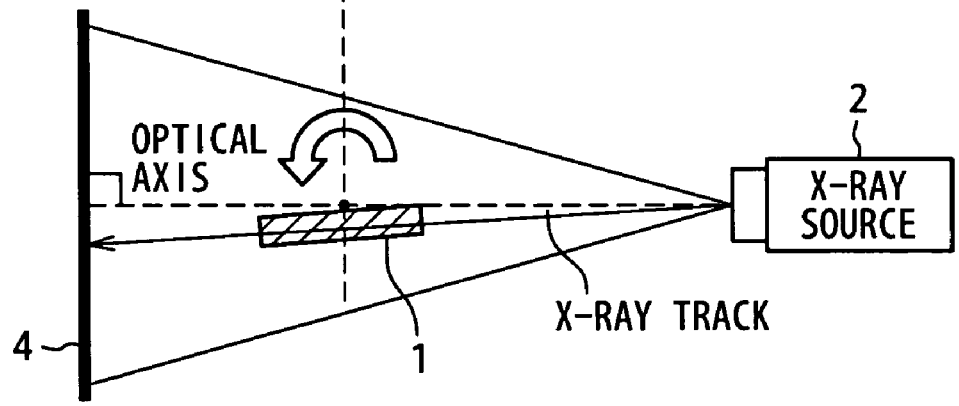
Figure 13A:
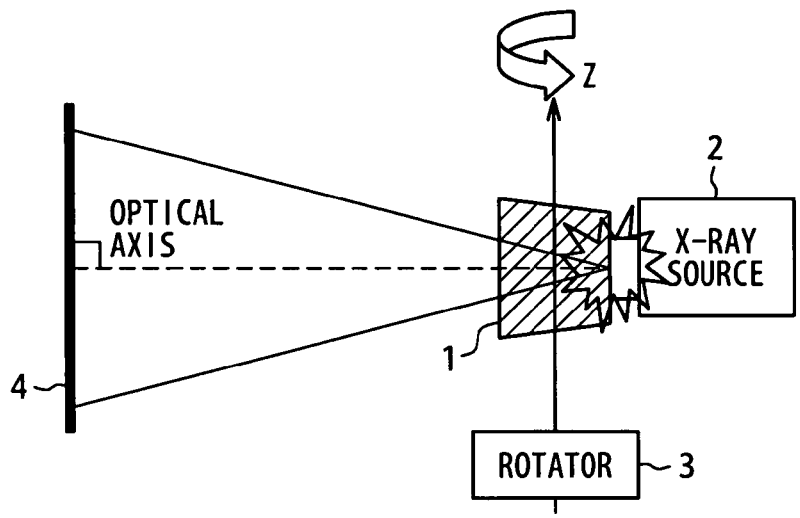
FIG. 13a-13b is a view for illustrating the problems of difficulty in increasing magnification in the related art three-dimensional CT system.
Figure 13B:
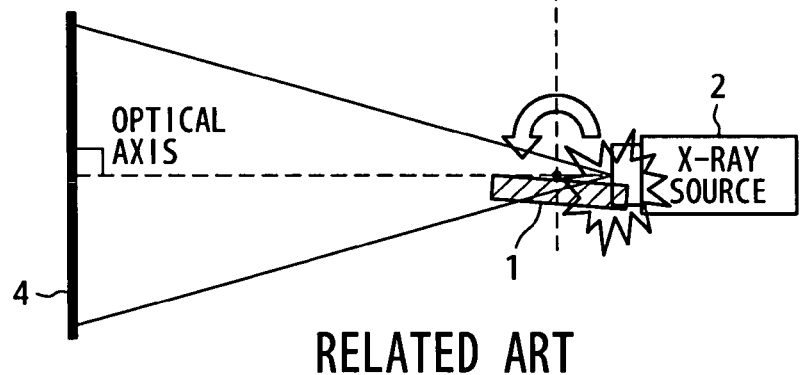
Figure 14:
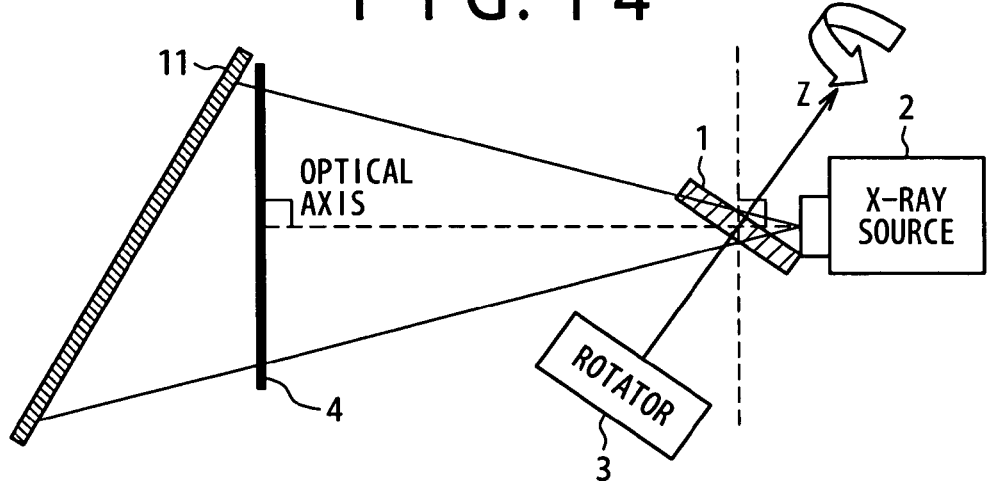
FIG. 14 is a view showing one instance of a configuration of the related art three-dimensional CT system that gives an inclination to a rotation axis of a rotator.

By the way, a series of processing carried out by the above image processing apparatus 31 is made executable not only by hardware, but also by software. In a case of executing the series of processing by the software, a program contained in the software is installed from a recording medium into a dedicated hardware-integrated computer, or a personal computer etc. capable of performing various functions by an installation of various programs, such as a personal computer having the configuration as shown in FIG. 9, for instance.

An illustrated personal computer 90 has a CPU (Central Processing Unit) 91 built therein. An input/output interface 95 is connected to the CPU 91 through a bus 94. A ROM (Read Only Memory) 92 and a RAM (Random Access Memory) 93 are connected to the bus 94.

To the input/output interface 95 are connected an input unit 96 having input devices such as a keyboard and a mouse serving to permit the user to input operation commands, an output unit 97 having a display device serving to display images etc. of the sectional image data generated on the basis of the volume data, a storage unit 98 consisting of a hard disc drive etc. serving to store various data and programs, and a communication unit 99 serving to receive the projection image data etc. supplied from the X-ray projecting apparatus 21. Further, to the input/output interface 95 is also connected a drive 100 serving to read and write data to a recording medium 101 including a magnetic disc (including a flexible disc), an optical disc (including a CD-ROM (Compact Disc-Read Only Memory) and a DVD (Digital Versatile Disc)), a magneto-optical disc (including a MD (Mini Disc)), or a semiconductor memory etc.

The program that causes the personal computer 90 to execute the series of processing as the processing to be carried out by the image processing apparatus 31 is stored in the recording medium 101, for instance, and, in this condition, is supplied to the personal computer 90 where the program is read by the drive 100 for the installation into the hard disk drive integrated in the storage unit 98. The program installed in the storage unit 98 is loaded from the storage unit 98 to the RAM 93 into execution in response to an instruction issued from the CPU 91 correspondingly to the user command inputted to the input unit 96.

Incidentally, in the present specification, it is to be understood that the steps executed on the basis of the program are specified as steps including not only the processing performed in time sequence according to a described sequence, but also the processing performed in parallel or individually although being not always performed in time series.

Further, the program may be provided in the form of a program processed by a single computer or a program distributed by more than one computer. Furthermore, the program may be also in the form of a program transferred to a remote computer into execution.

It is also to be understood that the system stated in the present specification is specified as a system that represents the whole apparatus composed of more than one apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An image information processing apparatus generating three-dimensional volume data corresponding to a sample on the basis of two-dimensional projection data of said sample from a full circumferential direction acquired by an image capturing apparatus comprising an irradiation unit irradiating transmittable energy onto a sample; a photo detector receiving said transmittable energy transmitted through said sample; and a rotator relatively rotating said sample to be mounted thereon and said irradiation unit and said photo detector, said image information processing apparatus comprising:

correcting means for correcting coordinate transformation of pixels of said projection image data, only in an effective pixel area, depending on an inclination angle of said rotator determined on the basis of a rotation axis of said rotator and an irradiation axis of said irradiation unit;

filtering means for giving a prescribed filtering processing to said pixels in the effective pixel area having been corrected by said correcting means; and voxel calculating means for calculating voxels only about an area contained in said volume data using said corrected and filtered pixels, wherein coordinate transformation involves seven coordinate systems.

2. The image information processing apparatus as claimed in claim 1, further comprising:

effective area specifying means for specifying, on the basis of established capturing conditions and assumed reconfiguration conditions relating to said volume data, the effective area obtained by excluding an area supposed to be not available for a generation of said volume data from the whole area of said projection image data;

reconfigurable area calculating means for calculating, on the basis of said capturing conditions, a reconfigurable area capable of generating said volume data; and calculation range information generating means for generating calculation range information that specifies a common area supposed to provide an overlap of said reconfigurable area with said volume data.

3. The image information processing apparatus as claimed in claim 2, wherein:

said correcting means corrects said pixels located in said effective area, among the pixels contained in said projection image data, and said voxel calculating means calculates, using said pixels of said projection image data having been given the filtering processing by said filtering means and depending on said inclination angle of the rotator, the voxels of said volume data corresponding to the common area specified by said calculation range information.

4. The image information processing apparatus as claimed in claim 1, wherein:

said voxel calculating means calculates said voxels by repetitive operations of a triple loop corresponding to three coordinate axes of a volume data coordinate system, said repetitive operations composed of additions and subtractions of a three-dimensional vector.

5. The image information processing apparatus as claimed in claim 2, wherein:

said voxel calculating means may be configured to calculate the voxels of said volume data corresponding to the common area specified by single calculation range information, irrespective of a rotation angle of said rotator and in any of the repetitive operations of a triple loop.

6. An image information processing method generating three-dimensional volume data corresponding to a sample on the basis of two-dimensional projection data of said sample from a full circumferential direction acquired by an image capturing apparatus comprising an irradiation unit irradiating transmittable energy onto a sample; a photo detector receiving said transmittable energy transmitted through said sample; and a rotator relatively rotating said sample to be mounted thereon and said irradiation unit and said photo detector, said image information processing method comprising the steps of:

a correcting step of correcting coordination transformation of pixels of said projection image data, only in an effective pixel area, depending on an inclination angle of said rotator determined on the basis of a rotation axis of said rotator and an irradiation axis of said irradiation unit;

a filtering step of giving a prescribed filtering processing to said pixels in the effective pixel area having been corrected by said correcting means; and a voxel calculating step of calculating voxels only about an area contained in said volume data using said corrected and filtered pixels, wherein coordinate transformation involves seven coordinate systems.

7. A program for generating three-dimensional volume data corresponding to a sample on the basis of two-dimensional projection data of said sample from a full circumferential direction acquired by an image capturing apparatus comprising an irradiation unit irradiating transmittable energy onto a sample; a photo detector receiving said transmittable energy transmitted through said sample; and a rotator relatively rotating said sample to be mounted thereon and said irradiation unit and said photo detector, said program embodied on a computer readable medium and causing a computer to execute the steps of:

a correcting step of correcting coordinate transformation of pixels of said projection image data, only in an effective pixel area, depending on an inclination angle of said rotator determined on the basis of a rotation axis of said rotator and an irradiation axis of said irradiation unit;

a filtering step of giving a prescribed filtering processing to said pixels in the effective pixel area having been corrected by said correcting means; and a voxel calculating step of calculating voxels only about an area contained in said volume data using said pixels, wherein coordinate transformation involves seven coordinate systems.

* * * * *